(12) United States Patent
Kondo et al.

(10) Patent No.: US 8,161,807 B2
(45) Date of Patent: Apr. 24, 2012

(54) DEVICES FOR DETECTING ACCUMULATION AMOUNT OF PARTICULATES

(75) Inventors: Jungo Kondo, Nishikamo-Gun (JP); Keiji Matsuhiro, Nagoya (JP); Kenji Aoki, Nagoya (JP); Atsuo Kondo, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 191 days.

(21) Appl. No.: 12/721,826

(22) Filed: Mar. 11, 2010

(65) Prior Publication Data

US 2010/0242442 A1 Sep. 30, 2010

(30) Foreign Application Priority Data

Mar. 25, 2009 (JP) .................................. 2009-074358

(51) Int. Cl.
*G01M 15/10* (2006.01)
(52) U.S. Cl. .................................................... 73/114.69
(58) Field of Classification Search ............... 73/114.69, 73/114.71, 114.74, 114.75
See application file for complete search history.

(56) References Cited

U.S. PATENT DOCUMENTS

| 4,580,441 | A | 4/1986 | Sakurai et al. | |
|---|---|---|---|---|
| 7,260,930 | B2 * | 8/2007 | Decou et al. | 60/295 |
| 7,677,031 | B2 * | 3/2010 | Knitt | 60/295 |
| 2008/0018442 | A1 * | 1/2008 | Knitt | 340/438 |
| 2008/0059093 | A1 * | 3/2008 | Bromberg et al. | 702/76 |
| 2009/0217818 | A1 * | 9/2009 | Gonze et al. | 95/278 |

FOREIGN PATENT DOCUMENTS

| EP | 1 764 626 | A2 | 3/2007 |
| JP | 59-204747 | A1 | 11/1984 |
| JP | 2007-079466 | A1 | 3/2007 |
| JP | 2009-002276 | A1 | 1/2009 |
| JP | 2009-057948 | A1 | 3/2009 |
| JP | 2009-250062 | A1 | 10/2009 |
| WO | 2009/031600 | A2 | 3/2009 |

OTHER PUBLICATIONS

U.S. Appl. No. 12/721,797, filed Mar. 11, 2010, Kondo, et al.
U.S. Appl. No. 12/721,892, filed Mar. 11, 2010, Kondo, et al.
Jeff Fortin, "*Advanced DPF Soot Sensor*," GE Sensing and Inspection Technologies, GE: International CTI Forum, Dec. 2-4.

* cited by examiner

*Primary Examiner* — Eric S McCall
(74) *Attorney, Agent, or Firm* — Burr & Brown

(57) ABSTRACT

A device for detecting particulates includes: a filter; a filter container; an upstream pipe; a downstream pipe; an upstream detecting unit; and a downstream detecting unit. The upstream detecting unit has a branch flow route for receiving gas from the upstream pipe, a trapping portion, a transmitting portion for transmitting an electromagnetic wave to the trapping portion, and a receiving portion for receiving an electromagnetic wave from the trapping portion. The downstream detecting unit has a branch flow route for receiving gas from the downstream pipe, a trapping portion, a transmitting portion for transmitting an electromagnetic wave to the trapping portion, and a receiving portion for receiving an electromagnetic wave from the trapping portion. The amount of the particulates trapped in the filter is detected based on a difference between detection values of the mass of the particulates trapped in the upstream and downstream trapping portions.

6 Claims, 5 Drawing Sheets

DEVICES FOR DETECTING ACCUMULATION AMOUNT OF PARTICULATES

This application claims the benefit of Japanese Patent Application P2009-74358 filed on Mar. 25, 2009, the entirety of which is incorporated by reference.

TECHNICAL FIELD

The present invention relates to a device for detecting an accumulation amount of particulates, which may be used for detection of PM accumulation amount in a filter disposed in an exhaust system of an internal combustion engine such as a diesel engine or the like.

BACKGROUND ART

Toxic substances in the internal combustion engine, such as the diesel engine, are discharged as PM (particulate matter: soot composed of carbon fine particles, high-molecular weight hydrocarbon fine particles, sulfur-based fine particles such as sulfate, etc.). Since the Environmental Agency recently has considered deciding an environmental criterion with respect to fine particulates with particle size of 2.5 μm or less to more strictly regulate particulates, a development race has been performed to respond to the stricter regulations.

As an exhaust emission control system for diesel engine, a sealed type ceramic honeycomb body (diesel PM filter: DPF) is prevalent. The DPF has a ceramic honeycomb structure in which both ends of opening parts of cells are alternately sealed. That is, the DPF includes inflow-side cells sealed on exhaust gas downstream side, outflow-side cells sealed on exhaust gas upstream side, and a cell partition wall defining the inflow-side cells and the outflow-side cells, respectively. The particulates are trapped by passing exhaust gas through pores of the cell partition wall.

However, since accumulation of the particulates causes increase in pressure loss of exhaust gas in the DPF, the DPF must be regenerated by removing the accumulated particulates to suppress deterioration of output or fuel consumption in the internal combustion engine. Therefore, forced regeneration of the DPF is being performed by burning the accumulated PM, for example, according to the following process. That is, the temperature of exhaust gas is raised by adding a reducing agent, such as fuel, to the exhaust gas, the reducing agent is burned with an oxidation catalyst disposed on the upstream side of the DPF, and the resulting high-temperature exhaust gas is then supplied to the DPF.

However, when such a regeneration control is performed in a state where the particulates are trapped within the filter in an accumulation amount beyond a certain filter use limit value, cracking or melting loss of the filter is caused by localization of temperature or excessive rise of overall temperature of the filter resulting from the burning of PM. For preventing such a failure, prediction of accumulation amount of particulates within the filter is performed by measuring the pressure loss in the filter, an intake air quantity, an exhaust gas temperature, a fuel injection quantity, an EGR opening, an engine speed or the like and performing arithmetic processing thereto in ECU.

On the other hand, in the general internal combustion engine such as the diesel engine, a value is obtained by multiplying a safety ratio to this filter use limit value and then adopted as a regeneration control point. The point is generally represented by regeneration control point (g/L)=filter use limit value (g/L)×safe factor, wherein the safe factor is 0<safe factor<1. Accordingly, the regeneration control point is set so as to satisfy the relationship of regeneration control point (g/L)<filter use limit value (g/L).

This safety factor is differently set by each automobile maker, and is determined according to the completion rate of prediction technique for accumulation amount of particulates in the filter or the guideline for safety of each maker. As the safety factor is closer to 1, the filter regeneration becomes less frequent, so that the fuel efficiency is less deteriorated. Therefore, the accumulation amount of particulates in the filter needs to be accurately predicted.

When the accumulation amount of particulates is determined to reach the regeneration control point, the exhaust gas temperature is forcedly raised to perform the regeneration of the filter. A method therefor is described in Japanese Patent Application Laid-Open No. Sho 59-204747A. That is, a microwave transmitting antenna and a microwave receiving antenna are set respectively on opposed side walls of an exhaust gas conduit to measure a concentration of graphite distributing between the both.

Further, a method for detecting soot accumulated in DPF is described in "Advanced DPF soot sensor presented by GE: International CTI Forum 2-4 Dec", in which RF transmitting antenna and receiving antenna are set respectively at the inlet and outlet of a DPF container.

In Japanese Patent Application Laid-Open No. 2009-2276A, a transmitting antenna and a receiving antenna are mounted on a center part of an outer wall of a DPF filter so as to be opposed to each other. An electromagnetic wave of several tens GHz to several tens THz is transmitted from the transmitting antenna, passed through the filter, and received by the receiving antenna mounted on the opposite side. The accumulation amount of particulates to the filter is thereby calculated based on the received intensity of the electromagnetic wave.

Japanese Patent Publication No. 2007-79466A describes an LN modulator.

SUMMARY OF THE INVENTION

However, in detection of the accumulation amount of particulates such as soot by use of microwave, absorption of carbon particles, main components of soot, is not large. In the GE soot sensor of "Advanced DPF soot sensor presented by GE: International CTI Forum 2-4 Dec", for example, although a dynamic range of about 15 dB is obtained by arithmetic processing such as average processing, sufficient sensitivity cannot be ensured in practice due to fluctuating parameters such as material or shape of DPF, exhaust gas pipe shape, particle size and particulate component.

The detection using microwave further has the following problem. That is, it can be adapted only within an accumulation amount range of from 2 to 4 g/L since the absorption sensitivity is deteriorated when soot is accumulated to some degree. Since the soot accumulation amount limit of DPF is generally 5 g/L or more, only an algorithm of performing regeneration processing in spite of the presence of a sufficient accumulation capacity is established. This is insufficient from the point of improvement in fuel efficiency.

In Japanese Patent Application Laid-Open No. 2009-2276A, the transmitting antenna and the receiving antenna are set on the container outer wall of the DPF filter so as to be opposed to each other, and a millimeter wave or terahertz wave is used and radiated so as to transverse the filter. The wave is thus transmitted by particulates existing within a cross section of the filter, and its transmitted amount is measured.

However, according to such method of irradiating electromagnetic wave onto a filter to detect an amount of particulates trapped in the filter, a transmitting antenna for irradiating the electromagnetic wave and a receiving antenna for receiving the wave are contained in a discharge tubes. The adhesion of the particulates onto the antennas or the temperature change in the discharge tube would thus change the detection sensitivity.

An object of the present invention is to improve the sensitivity, reliability and stability on temperature of detection, in a device for detecting an accumulation amount of particulates trapped in a filter by use of electromagnetic wave.

The present invention provides a detecting device of particulates. The device comprises:

a filter for trapping particulates from a gas containing the particulates;

a container for containing the filter;

an upstream pipe provided on the upstream side of the container to lead the gas into the container;

a downstream pipe provided on the downstream side of the container to lead the gas passed through the filter;

an upstream detecting unit provided to the upstream pipe, the upstream detecting unit comprising a branch flow route for leading the gas from the upstream pipe into the branch flow route, an upstream trapping portion provided in the branch flow route, a transmitting portion transmitting the electromagnetic wave to the upstream trapping portion, and a receiving portion receiving the electromagnetic wave from the upstream trapping portion, and a downstream detecting unit provided to the downstream pipe, the downstream detecting unit comprising a branch flow route for leading the gas from the downstream pipe into the branch flow route, a downstream trapping portion provided in the branch flow route, a transmitting portion transmitting the electromagnetic wave to the downstream trapping portion, and a receiving portion receiving the electromagnetic wave from the downstream trapping portion.

The amount of the particulates trapped in the filter is detected based on a difference between a detection value of the mass of the particulates trapped in the upstream trapping unit and a detection value of the mass of the particulates trapped in the downstream trapping unit.

According to the device, bypass flow routes are provided to the upstream and downstream pipes, respectively, and the trapping portions for the particulates are provided in the flow routes, respectively. The particulates trapped in the respective trapping portions are detected using electromagnetic wave. The amount of the trapped particulates in the upstream bypass flow route and that in the downstream bypass flow route are compared to each other to prove that the amount of the particulates trapped in the filter can be calculated.

According to the present invention, the amounts of the particulates trapped in the respective trapping portions in the bypass flow routes are detected using electromagnetic wave. The particulates floating in a gas is difficult to detect by electromagnetic wave to result in a low sensitivity. On the contrary, the amount of the trapped particulates can be detected at a relatively high sensitivity.

In addition to this, the transmitting and receiving portions for electromagnetic wave are not provided in the upstream and downstream pipes. It is thus possible to prevent the reduction of sensitivity due to the adhesion of a large amount of particulates flowing in the pipes onto the antennas and to prevent the fluctuation of the detection value due to the temperature change in the pipes.

DETAILED DESCRIPTION OF THE INVENTION

Figure 1:
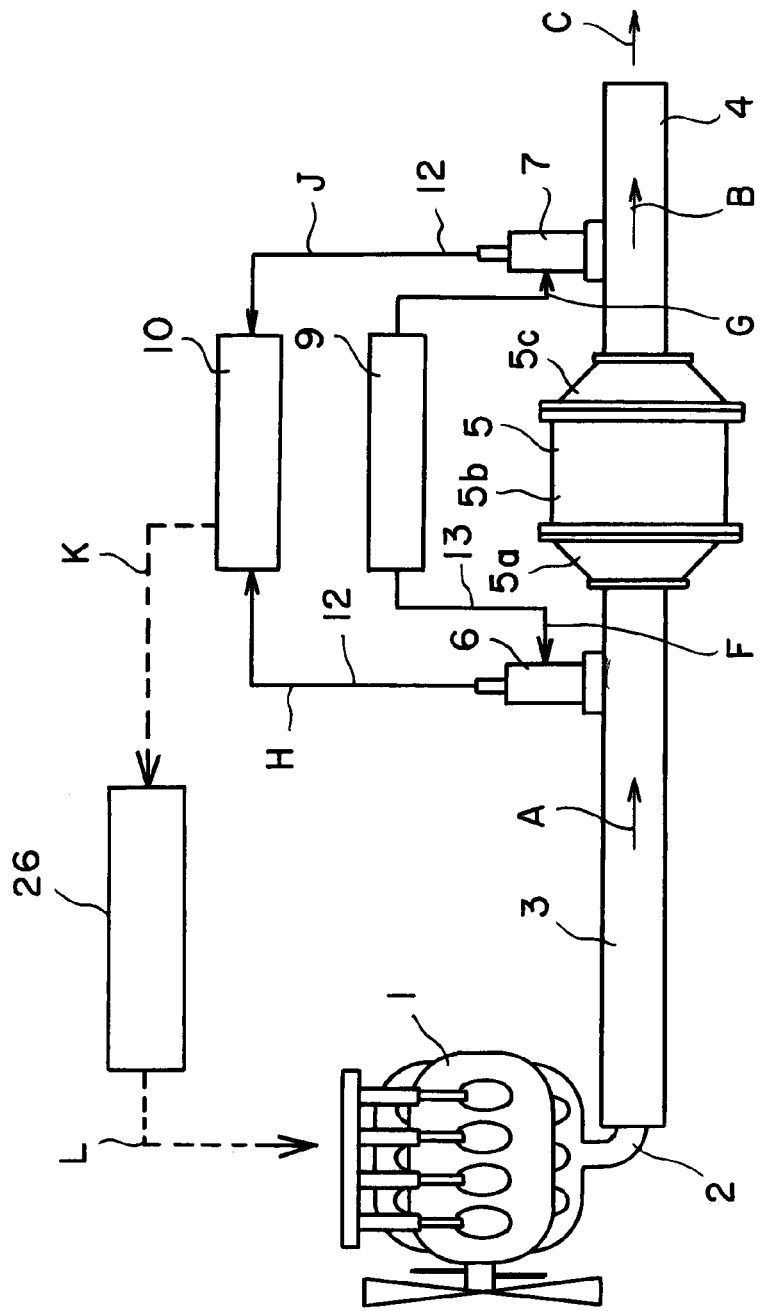
FIG. 1 is a block diagram schematically showing a device for detecting an accumulation amount of particulates according to the present invention.

According to the present invention, millimeter wave, terahertz wave and micro wave may be used. However, as the frequency of the electromagnetic wave is higher, the detection sensitivity of the particulates are improved. Further, the absorption and dielectric loss of the particulate materials (carbon or an organic material) are increased in millimeter or terahertz wave bands, so that the detection sensitivity can be more improved.

More preferably, electromagnetic wave of a frequency of 30 GHz or higher and 10 THz or lower is used. The electromagnetic wave has a high absorption coefficient for soot, so that an accumulation amount of 0 g/L or more and 99 g/L can be detected in high linearity, the sensor sensitivity of 0.1 g/L can be accurately obtained and a dynamic range of, for example, 25 dB can be realized in a range of 2 to 4 g/L.

As a transmitting device, the followings are preferred but are not limited.

(Frequency 10 GHz to 100 GHz)

MMIC such as GaAs or SiGe or gun diode (50 GHz to 1 THz)

An optical multiplying system adapted to generate the above-mentioned electromagnetic wave by generating high-order optical sideband waves by an LN modulator to take out a sideband wave of a desired order, and taking out a beat signal thereof by a photomixer. In this case, a Mach-Zehnder optical modulator or phase modulator, or the integrated modulator thereof can be used as the LN modulator. When a thin plate structure described in Japanese Patent Application Laid-Open No. 2007-79466A is used as the LN modulator, but is not particularly limited, half-wavelength voltage can be reduced to generate the electromagnetic wave at low driving voltage.

Further, a PPLN (Periodically Poled Lithium Niobate) element or PPLT (Periodically Poled Lithium Tantalate) element having a domain-inverted structure (QPM: Quasi-Phase-Matching) formed thereon, and an optical waveguide (including a slab structure) element using Cherenkov radiation can be used.

(100GHz to 10 THz)

A PPLN (Periodically Poled Lithium Niobate) element or PPLT (Periodically Poled Lithium Tantalate) element having a domain-inverted structure (QPM: Quasi-Phase Matching) formed thereon, and an optical waveguide (including a slab structure) element using Cherenkov radiation can be used.

Examples of a receiving device include, but are not limited to, a shot key diode such as GaAs, InAs or GaN, a bolometer, and a device using pyroelectric effect.

The particulates mean substances having the property of being suspended within a gas, and the particle size thereof is typically 10 nm to 10 µm but is not limited. Examples of the substances constituting the particulates include, but are not particularly limited to, PM (particulate matter) mainly composed of carbon, hydrocarbon (HC), magnetic powder such as ferrite powder, sulfate, and nitrate.

The filter is disposed within the container through which the gas containing particulates is distributed. As the filter, a one which can transmit the electromagnetic wave used in the present invention with lower transmissivity is more suitably used. Examples of the form of the filter include a honeycomb structure and a porous structure, and the honeycomb structure is particularly preferred. The filter is preferably formed of ceramics such as cordierite, silicon nitride, alumina or silicon carbide.

According to the present invention, the upstream detecting unit is provided to the upstream pipe and the downstream detecting unit is provided to the downstream pipe. The flow routes are thereby branched so that the gas containing the particulates is diverged and flown into the respective flow routes. The transmitting portion and receiving portion, as well as the trapping portions trapping the particulates in the gas diverged from the pipes, are provided in the detecting units, respectively.

Each of the transmitting and receiving portions may be a loop antenna, a rod antenna or the like. The antennas may be positioned so that they oppose each other. Alternatively, the antennas may be positioned so that they do not oppose each other.

It is required that each trapping portion can propagate the electromagnetic wave toward the receiving portion and does not stop the flow of the gas flowing in each branch flow route. As far as such requirements are satisfied, the material of the trapping portion is not limited, and includes the followings.
(1) A mesh made of a metal
(2) A porous body made of a metal or ceramics
(3) A mesh made of an insulating material or semiconductor (preferably ceramics), or the mesh whose surface is coated with a metal film
(4) A filter, or the filter whose surface is coated with a metal film The shape of the mesh structure may be adjusted and/or a metal is coated on the surface of the mesh, so that the electromagnetic wave used can be effectively transmitted through the mesh.

Such metal forming the mesh, porous body or coating may preferably Ni, Au, Pt, Cu, or stainless steel. Further the ceramics forming the mesh or porous body may preferably be alumina, quartz or a glass.

In general, the inside diameter of the pipe is often set to, but is not limited to, 10 to 300 mm. The inside diameter (maximum value) of the container is larger than the inside diameter of the pipe. Accordingly, the electromagnetic wave used must have an electric length $\lambda c$ of cut-off or less of a pipe inside diameter Di, and the frequency of the electromagnetic wave must be thus set to a frequency fc or more ("c" is light speed).

$fc=c/Di$ frequency of electromagnetic wave $(c/\lambda c) \geq fc=c/Di$ $\lambda c \leq Di$ The inside diameter (maximum value) of the container is set preferably to 20 mm or more, and set preferably to 1000 mm or less.

The container preferably includes a storage part for storing the filter, an upstream connection part and a downstream connection part. In this case, the inside diameter of the storage part is larger than that of the pipe. It is preferred that the inside diameter of the upstream connection part is reduced from the storage part toward the upstream pipe. It is also preferred that the inside diameter of the downstream connection part is reduced from the storage part toward the downstream pipe.

In the present invention, the exhaust emission control system further comprises a reducing agent supply means for supplying a reducing agent into exhaust gas on the upstream side of the filter. The reducing agent may be directly supplied into the exhaust gas, or can be indirectly supplied to the exhaust gas by post-injecting the reducing agent into a cylinder. When the temperature of the filter is higher than the igniting temperature of the reducing agent, the reducing agent burns within the filter, and the filter is raised in temperature to, for example, 600° C. or higher by the combustion heat, whereby the filter can be regenerated. The reducing agent supply means include a pump, an injector or the like. Further, an oxidization catalyst may be disposed on the upstream side of the filter, or a catalyst layer may be formed in the filter.

When the reducing agent supply means is used, a control means is desirably provided to control the drive of the reducing agent supply means based on a detection value of accumulation amount of particulates trapped in the filter. According to this, the reducing agent supply means can be driven at an optimum time to improve the fuel efficiency.

EXAMPLES

Figure 2:
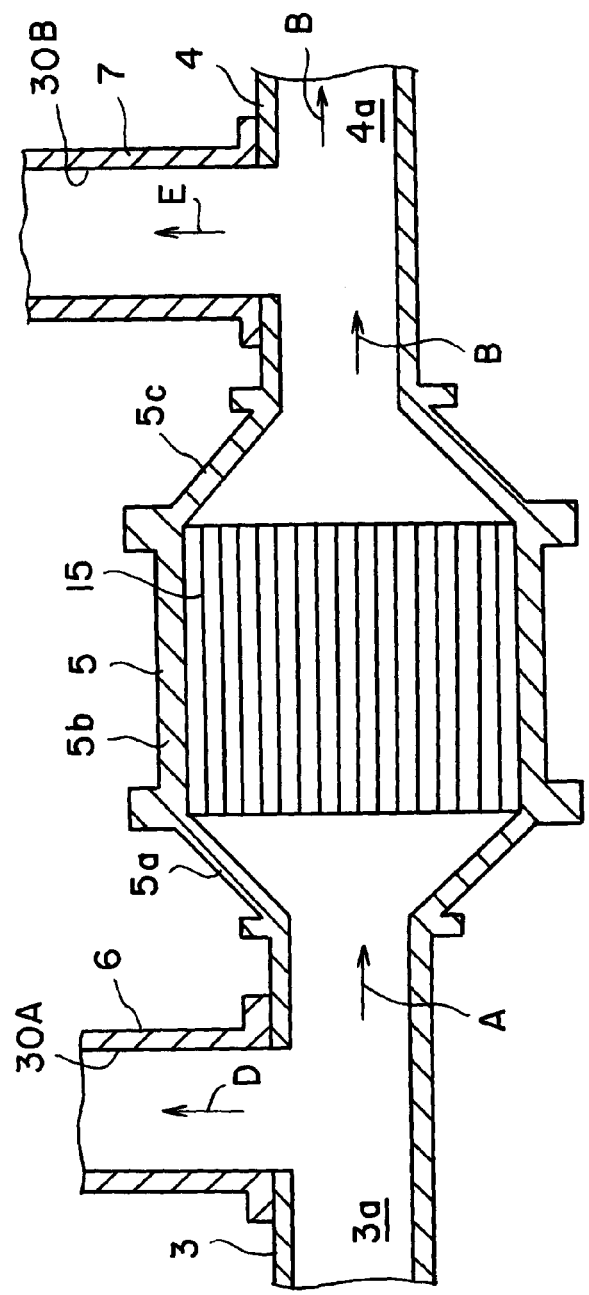
FIG. 2 is a partially enlarged cross-sectional view showing an area around a filter and a container in the device according to the present invention.

FIG. 1 schematically shows an exhaust emission control system. An exhaust pipe 2 of an exhaust manifold of a diesel engine 1 is connected to a container 5 through an upstream pipe 3. A downstream pipe 4 is provided on the downstream side of the container 5. The container 5 includes, as shown in FIG. 2, a storage part 5b with a constant inside diameter for storing a filter, an upstream connection part 5a and a downstream connection part 5c.

A filter 15 is stored within the storage part 5b of the container 5. The filter 15 is composed of a porous ceramic honeycomb structure having a number of pores regularly formed therein. A part of the pores is sealed on the exhaust gas downstream side to form inflow-side cells, and the remainder thereof is sealed on the exhaust gas upstream side to form outflow-side cells. The inflow-side cells and the outflow-side cells are formed to be alternately adjacent to each other, whereby a honeycomb-shaped wall flow structure is constituted.

Figure 3:
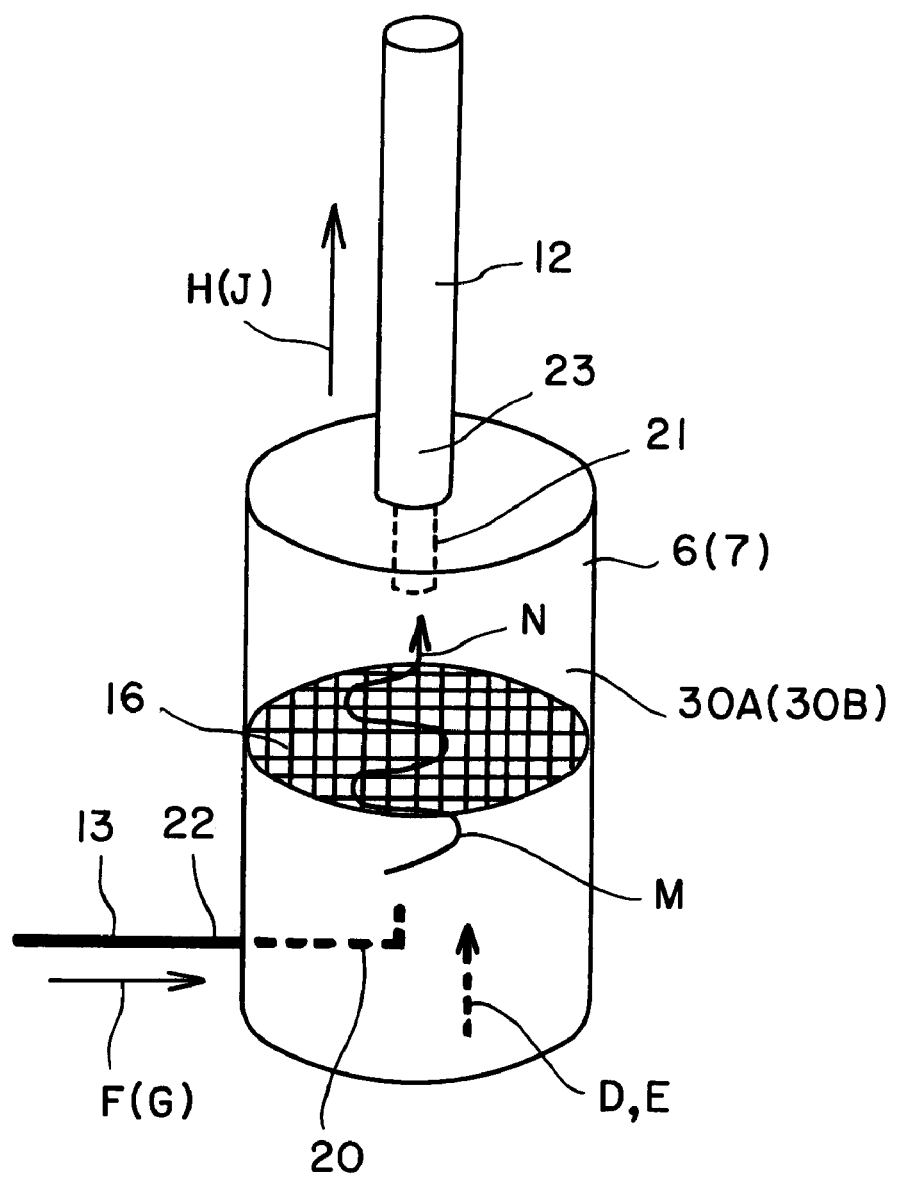
FIG. 3 is a perspective view schematically showing each detecting unit.
Figure 4:
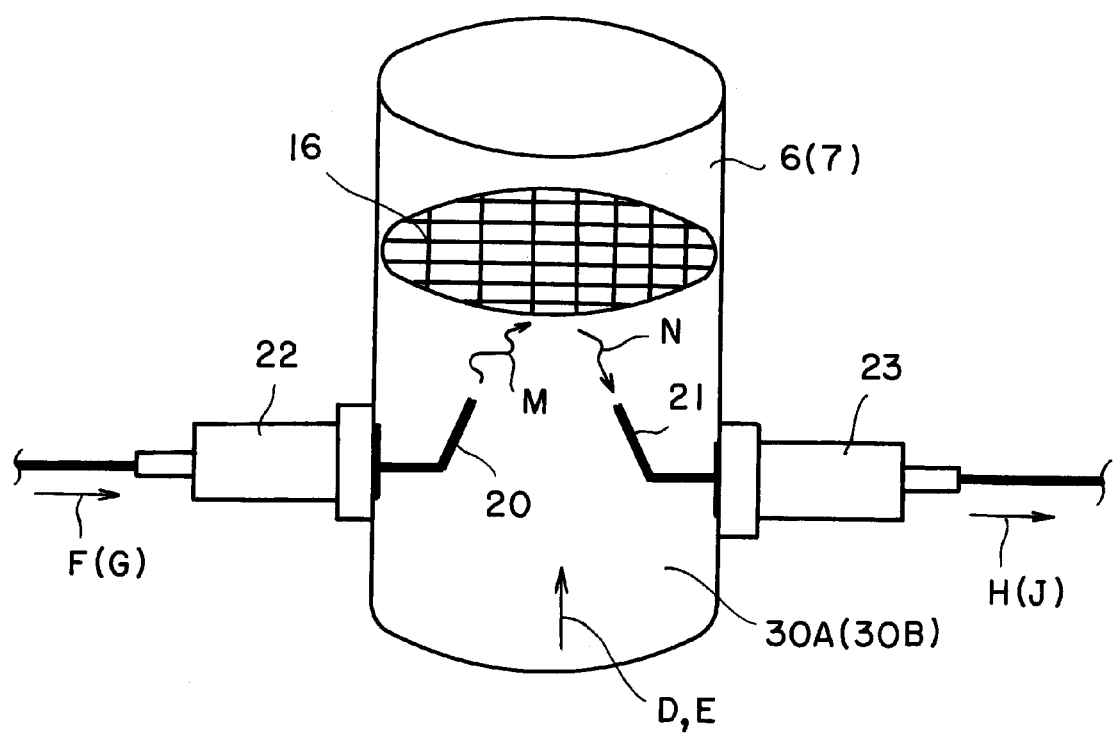
FIG. 4 is a perspective view schematically showing each detecting unit according to another embodiment.

An upstream detecting unit 6 is provided to an upstream pipe 3, and a downstream detecting unit 7 is provided to a downstream pipe 4. FIGS. 3 and 4 represent the shapes of the detecting units, respectively.

According to an example of FIG. 3, a trapping portion 16 is provided in each of branch flow routes 30A, 30B of the detecting units, 6 and 7. A transmitting antenna 20 is provided in the downstream (pipe side) of the trapping portion 16, and a receiving antenna 21 is provided on the opposite side. A transmitting device 22 is connected to the transmitting antenna 20, and a receiving device 23 is provided to the receiving antenna 21.

According to an example of FIG. 4, a trapping portion 16 is provided in each of the branch flow routes 30A, 30B of the detecting units, 6 and 7. A transmitting antenna 20 and a receiving antenna 21 are provided in the downstream (pipe side) of the trapping portion 16. The transmitting device 22 is connected to the transmitting antenna 20, and the receiving device 23 is provided to the receiving antenna 21.

Exhaust gas from the engine 1 flows in an exhaust pipe 2 and then flown into a flow route 3a of the upstream pipe 3, as shown by arrow A, to enter the container 5, in which it passes the filter 15, then flows in a flow passage 4a of the downstream pipe 4, as shown by arow B, and discharges out as shown by arrow C. Particulates are trapped and accumulated in the filter 15.

A part of the gas before passing through the filter is diverged on the upstream of the container 5 and flown into the branch flow route 30A of the detecting unit 6, as shown by arrow "D", to pass through the trapping portion 16. As a result, the particulates contained in the gas before passing the filter are trapped in the trapping portion 16. Further, a part of the gas after passing through the filter is diverged at the down stream of the container 5 and is flown into the branch flow route 30B of the detecting unit 7, as shown by arrow "E", to pass through the trapping portion 16. As a result, the particulates contained in the gas after passing the filter are trapped in the trapping portion 16.

According to the present invention, Signals "F" and "G" are transmitted from an electromagnetic wave oscillating device 9 to each element of each detecting unit via path 13. Responsive to the signal, in each detecting unit, the electromagnetic wave is irradiated from each transmitting antenna 20 toward the trapping portion 16 as shown by arrow "M". In the example of FIG. 3, the electromagnetic wave transmits through the trapping portion 16 and then received by the receiving antenna 21 on the opposite side as shown by arrow "N". Further, in the example of FIG. 4, the electromagnetic wave is reflected by the trapping portion 16 and then received by the receiving antenna 21.

In each of the detecting units 6 and 7, each received signal is transmitted to a control unit 10 via path 12, as shown by arrows "H" and "J" and then processed in the control unit 10. The thus obtained information about the transmitted electromagnetic wave and that of the received electromagnetic wave is transmitted to a calculating unit 26, as shown by arrow "K". In the calculating unit 26, for each of the detecting units 6 and 7, the intensity of the transmitted wave is compared with that of the received wave and the result is referred to information of the standard curve of the intensity of the electromagnetic wave and the accumulation amount, to calculate the accumulation amount.

Since the filter itself absorbs the electromagnetic wave to some degree, the received intensity is preliminarily measured, as a blank, in a state in which no particulates are trapped in the filter. The accumulation amount of particulates is calculated based on a difference of the received intensity in a state where the particulates are trapped and the received intensity without the trapped particulates, and an electromagnetic wave absorption coefficient.

The electromagnetic wave absorption coefficient is expressed by a logarithm of electromagnetic wave transmissivity, and the transmissivity is a ratio of outgoing output to incoming output.

Specifically, the accumulation amount of the particulates in the gas can be calculated as follows.

First, the amount of the particulates trapped in the trapping portion 16 can be generally calculated as follows.

$$M = m/V = \left(\frac{S}{kV}\right)\ln\left(\frac{I_o}{I}\right)$$

M: mass concentration of the trapped particulates
m: mass of the particulates per an unit trapping area in the trapping portion
V: integrated absorption amount of the gas S: Total trapping area of the trapping portion
K: Cross sectional area of electromagnetic wave absorption per an unit mass of the particulates
Io: Intensity of electromagnetic wave passing through the trapping portion without trapped particulates
I: Intensity of electromagnetic wave passing through the trapping portion with trapped particulates This process is applied on the upstream detecting unit 6 to detect the mass (Mb1) of the particulates trapped from the gas "D" flown into the upstream detecting unit 6. Further, this process is applied on the downstream detecting unit 7 to detect the mass (Mb2) of the particulates trapped from the gas "E" flown into the upstream detecting unit 7.

The amounts of the gas flown into the detecting units 6 and 7 from the respective upstream and downstream pipes can be controlled by adjusting the diameters of the pipes, the position of the detecting unit and the by-pass angle. That is, the ratio of the gas flowing into each of the branch routes 30A and 30B with respect to the gas flowing in each pipe can be calculated as each amending factor. Therefore, when the accumulation amount of the particulates detected in each detecting unit is detected, it can be converted to the amount of the particulates flowing in the whole pipe.

Specifically, the accumulation amount Mb1 of the particulates detected by the upstream detecting unit 6 is integrated with the amending factor decided by the bypass shape to calculate the amount "M1" of the particulates flowing in the upstream pipe. Similarly, the accumulation amount Mb2 of the particulates detected by the downstream detecting unit 7 is integrated with the amending factor decided by the bypass shape to calculate the amount "M2" of the particulates flowing in the downstream pipe. The value of "M1-M2" is the accumulation amount in the filter 15.

The thus obtained value (M1-M2) of the accumulation amount is outputted, as shown by arrow "L" for subsequent utilization. For example, the filter may be washed or a signal for the replacement may be transmitted at the time when the accumulation amount exceeds a threshold value. Further, a difference of M1 and M2 becomes smaller and lower than a threshold value, the failure of the filter is meant, so that the failure of the filter can be thereby detected.

According to the present invention, the bypass flow routes 30A and 30B are provided to the upstream pipe 3 and downstream pipe 4, respectively, and the trapping portion 16 for trapping the particulates are provided therein. The particulates trapped in the respective trapping portions are detected using electromagnetic wave. Then, the accumulation amount in the bypass flow route on the upstream side of the filter is compared with the accumulation amount of in the bypass flow route on the downstream side to calculate an accumulation amount in the filter. Moreover, transmitting and receiving antennas are not necessarily provided in the pipes. It is thus possible to prevent the reduction of sensitivity due to the adhesion of a large amount of the particulates flowing in the pipes onto the antennas, and to prevent the fluctuation of the detection value due to the temperature change in the pipes.

In actual use, when the trapping filter is burned for the regeneration, it is possible to initialize the trapping filters in the respective detecting units for monitoring so that continuous monitoring can be realized.

The device described with reference to FIGS. 1 to 3 was manufactured and subjected to measurement experiment. The frequency of the electromagnetic wave was made 100 GHz. The internal diameters of the pipes for the respective flow routes 30A and 30B, as shown in FIG. 3, were made 1 inch, and it is adjusted so that ¹⁄₁₀ (amending factor) of the whole flow rate of the gas was flown from the main pipes 3 and 4 into the branch flow routes, respectively. As the filter 16 for trapping the particulates, a honeycomb filter having a wall flow structure and having a diameter of 1 inch and a length of 50 mm was provided in each of the flow routes 30A and 30B. The transmitting and receiving antennas were made of a horn antenna.

Figure 5:
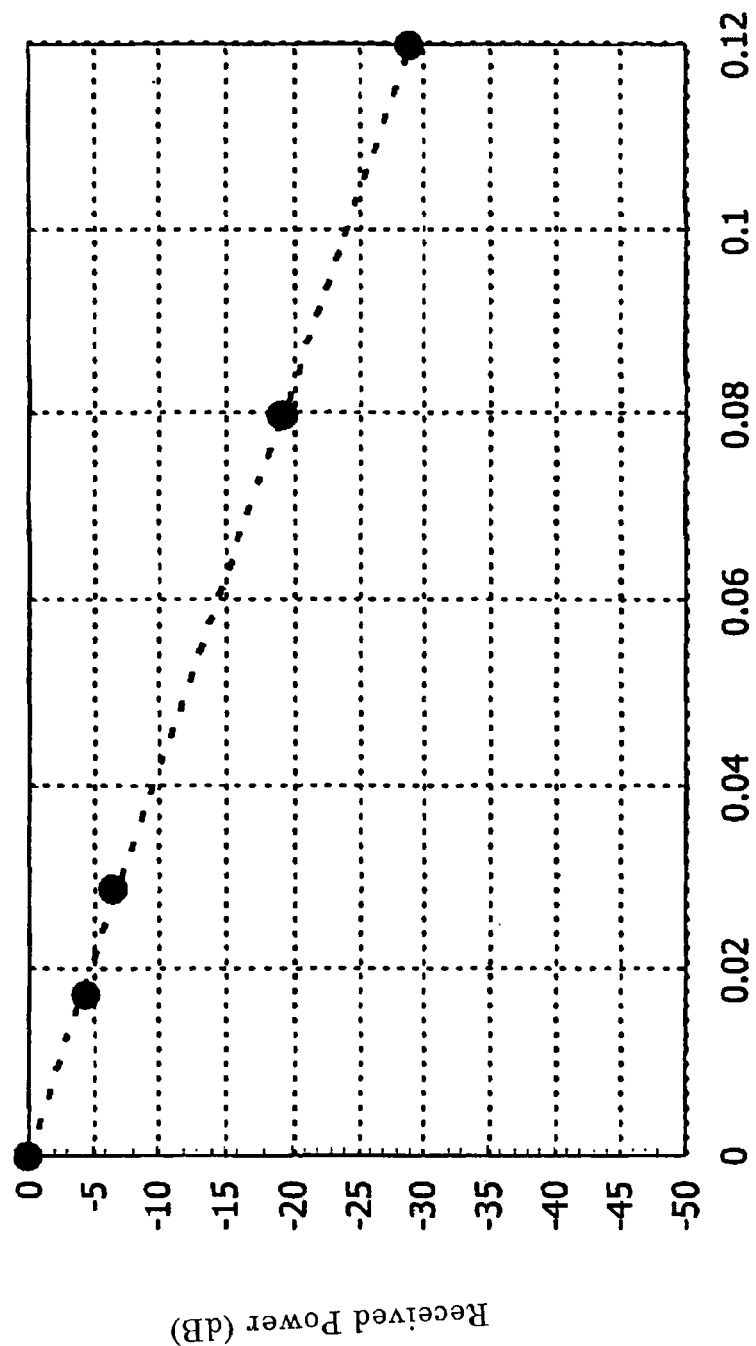
FIG. 5 is a graph showing relationship between a mass "m" ($g/cm^2$) of particulates per an unit trapping area of a trapping portion in each branch flow route and a received intensity.

The thus obtained results are shown in FIG. 5. The results shows the relationship between the mass (g/cm$^2$) of the particulates per an unit trapping area of the trapping portion and the received intensity. As can be seen from the results, it is confirmed that the received intensity of the electromagnetic wave is linearly changed with respect to the accumulation amount. Further, the results were the same in the upstream and downstream detecting units. Therefore, the amount of the particulates trapped in the upstream detecting unit can be calculated from the received intensity in the upstream detecting unit, so that the amount of the particulates in the gas flowing in the upstream pipe can be calculated. Further, the amount of the particulates trapped in the downstream detecting unit can be calculated from the received intensity in the downstream detecting unit, so that the amount of the particulates in the gas flowing in the downstream pipe can be calculated. The difference between the amount of the particulates in the gas flowing in the upstream pipe and the amount of the particulates in the gas flowing in the downstream pipe is used to calculate the accumulation amount trapped in the filter 15 (FIG. 2).

According to one example, in the upstream detecting unit, the intensity of the electromagnetic wave 10 (received intensity) was lowered by 6.47 dB with respect to the received intensity of the wave passing through the trapping portion where soot is not trapped. It was thus proved that the mass "m" was 0.029 g/cm$^2$. As a result, it was estimated that the whole mass Mb1 of the trapped particulates was 0.147 g. It was thereby estimated that the mass M1 of the particulates in the gas flowing through the upstream pipe was 1.47 g based on the amending factor.

Similarly, in the downstream detecting unit, the intensity of the electromagnetic wave 10 (received intensity) was substantially same as the received intensity of the wave passing through the trapping portion where soot is not trapped. It was thus proved that the mass "m" was substantially 0.00 g/m$^2$). As a result, it was estimated that the whole mass Mb2 of the trapped particulates was zero. It was thereby estimated that the mass M2 of the particulates in the gas flowing through the upstream pipe was zero.

As a result, the accumulation amount of the particulates trapped in the filter 15 can be calculated as 1.47 g.

The thus calculated value of the accumulation amount in the filter 15 could be used as a control signal for the regeneration of the filter 15.

The invention claimed is:

1. A device of detecting an accumulation amount of particulates, the device comprising:
    a filter for trapping particulates from a gas containing the particulates;
    a container for containing the filter;
    an upstream pipe provided on the upstream side of the container to lead the gas into the container;
    a downstream pipe provided on the downstream side of the container to lead the gas passed through the filter;
    an upstream detecting unit fitted to the upstream pipe, the upstream detecting unit comprising a branch flow route for leading the gas from the upstream pipe into the branch flow route, an upstream trapping portion provided in the branch flow route, a transmitting portion transmitting an electromagnetic wave to the upstream trapping portion, and a receiving portion receiving the electromagnetic wave from the upstream trapping portion; and
    a downstream detecting unit fitted to the downstream pipe, the downstream detecting unit comprising a branch flow route for leading the gas from the downstream pipe into the branch flow route, a downstream trapping portion provided in the branch flow route, a transmitting portion transmitting an electromagnetic wave to the downstream trapping portion, and a receiving portion receiving the electromagnetic wave from the downstream trapping portion,
    wherein an amount of the particulates trapped in the filter is detected based on a difference between a detection value of the mass of the particulates trapped in the upstream trapping portion and a detection value of the mass of the particulates trapped in the downstream trapping portion.

2. The device of claim 1, wherein the electromagnetic wave has a frequency of 30 GHz or more and 10 THz or less in both of the upstream detecting unit and the downstream detecting unit.

3. The device of claim 1, wherein each of the upstream trapping portion and the downstream trapping portion comprise a mesh.

4. The device of claim 1, wherein the container comprises a storage part for storing the filter, an upstream connection part connecting the storage part to the upstream pipe and a downstream connection part connecting the storage part to the downstream pipe, and wherein an inside diameter of the upstream connection part is reduced from the storage part toward the upstream pipe.

5. The device of claim 4, wherein an inside diameter of the downstream connection part is reduced from the storage part toward the downstream pipe.

6. The device of claim 1, wherein the particulates comprises a particulate matter.

* * * * *